United States Patent
Park et al.

(10) Patent No.: US 12,524,051 B2
(45) Date of Patent: Jan. 13, 2026

(54) METHOD FOR CONTROLLING POWER SUPPLY AND ELECTRONIC DEVICE USING SAME

(71) Applicant: SAMSUNG ELECTRONICS CO., LTD., Suwon-si (KR)

(72) Inventors: Dongwan Park, Suwon-si (KR); Sungyong Bang, Suwon-si (KR); Taeuk Park, Suwon-si (KR); Hyunil An, Suwon-si (KR); Jongmin Lee, Suwon-si (KR); Kiseong Jang, Suwon-si (KR); Woosuk Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 104 days.

(21) Appl. No.: 18/121,467

(22) Filed: Mar. 14, 2023

(65) Prior Publication Data

US 2023/0213990 A1    Jul. 6, 2023

Related U.S. Application Data

(63) Continuation of application No. PCT/KR2021/010731, filed on Aug. 12, 2021.

(30) Foreign Application Priority Data

Sep. 25, 2020 (KR) .................. 10-2020-0125247
Dec. 28, 2020 (KR) .................. 10-2020-0184382

(51) Int. Cl.
*G06F 1/26* (2006.01)
*G06F 1/28* (2006.01)
(Continued)

(52) U.S. Cl.
CPC ............ *G06F 1/263* (2013.01); *G06F 1/28* (2013.01); *G06F 1/3206* (2013.01); *G06F 1/324* (2013.01);
(Continued)

(58) Field of Classification Search
CPC . G06F 1/263; G06F 1/266; G06F 1/28; G06F 1/30; G06F 1/3212; G06F 1/324;
(Continued)

(56) References Cited

U.S. PATENT DOCUMENTS 5,230,074 A * 7/1993 Canova, Jr. ............ G06F 1/165
  714/24
5,270,946 A * 12/1993 Shibasaki ............... H02J 9/061
  713/340

(Continued)

FOREIGN PATENT DOCUMENTS

EP    0 551 080 A2    7/1993
JP    6-311666 A     11/1994
(Continued)

OTHER PUBLICATIONS

International Search Report (PCT/ISA/210) issued Nov. 24, 2021 by the International Searching Authority in International Patent Application No. PCT/KR2021/010731.
(Continued)

*Primary Examiner* — Thomas J. Cleary
(74) *Attorney, Agent, or Firm* — Sughrue Mion, PLLC

(57) ABSTRACT

An electronic device includes a first component included in the electronic device; a port configured to connect to an external power source; a battery; and a processor configured to: select an object to supply power to the first component included in the electronic device; and perform control so as to provide, using the selected object, power to the first component included in the electronic device.

13 Claims, 7 Drawing Sheets

(51) Int. Cl.
*G06F 1/3206* (2019.01)
*G06F 1/324* (2019.01)
*G06F 3/04847* (2022.01)
*G06F 11/30* (2006.01)

(52) U.S. Cl.
CPC ...... *G06F 3/04847* (2013.01); *G06F 11/3051* (2013.01)

(58) Field of Classification Search
CPC ............ G06F 3/04847; G06F 11/3051; G06F 11/3058
See application file for complete search history.

(56) References Cited

U.S. PATENT DOCUMENTS

| | | | | | |
|---|---|---|---|---|---|
| 5,282,054 | A | * | 1/1994 | Oana | H04N 1/00885 358/468 |
| 5,420,496 | A | * | 5/1995 | Ishikawa | G06F 1/263 320/DIG. 11 |
| 5,450,003 | A | * | 9/1995 | Cheon | G06F 1/263 323/272 |
| 6,137,280 | A | * | 10/2000 | Ackermann | H02M 3/1582 324/426 |
| 6,167,289 | A | * | 12/2000 | Ball | H02J 7/0024 455/572 |
| 6,470,290 | B1 | * | 10/2002 | Lee | G06F 1/3203 713/340 |
| 6,498,957 | B1 | | 12/2002 | Umetsu | |
| 8,639,954 | B2 | | 1/2014 | Winkler et al. | |
| 9,182,809 | B2 | * | 11/2015 | Kitano | G06F 1/263 |
| 9,509,161 | B2 | | 11/2016 | Son | |
| 9,804,648 | B2 | * | 10/2017 | Kuo | G06F 1/263 |
| 10,747,294 | B2 | * | 8/2020 | Minami | G06F 1/3287 |
| 11,061,848 | B1 | * | 7/2021 | Seto | G06F 1/3296 |
| 2002/0011823 | A1 | * | 1/2002 | Lee | G06F 1/1632 320/137 |
| 2003/0030412 | A1 | | 2/2003 | Matsuda | H02J 7/342 320/127 |
| 2004/0207404 | A1 | * | 10/2004 | Zhang | H02J 9/06 324/426 |
| 2006/0047983 | A1 | * | 3/2006 | Aleyraz | G06F 1/3215 713/300 |
| 2008/0045275 | A1 | * | 2/2008 | Le | H04W 52/0296 455/572 |
| 2008/0172566 | A1 | * | 7/2008 | Park | G06F 1/263 713/310 |
| 2008/0203970 | A1 | * | 8/2008 | Shen | H02J 7/0068 307/65 |
| 2010/0146307 | A1 | * | 6/2010 | Griffin, Jr. | G06F 1/263 713/300 |
| 2010/0210322 | A1 | | 8/2010 | Kim et al. | |
| 2010/0299548 | A1 | * | 11/2010 | Chadirchi | G06F 1/263 713/340 |
| 2012/0042185 | A1 | | 2/2012 | Lee et al. | |
| 2013/0310631 | A1 | * | 11/2013 | Lee | G06F 1/3218 600/16 |
| 2014/0075216 | A1 | * | 3/2014 | Guo | G06F 1/26 713/310 |
| 2014/0344588 | A1 | * | 11/2014 | Chou | G06F 1/30 713/300 |
| 2015/0187195 | A1 | * | 7/2015 | Ujike | G08B 29/181 340/693.1 |
| 2015/0188607 | A1 | | 7/2015 | Pletcher et al. | |
| 2015/0295511 | A1 | * | 10/2015 | Veeraraghavan | H02M 7/44 363/95 |
| 2016/0054745 | A1 | * | 2/2016 | Sawyers | G06F 1/26 324/71.1 |
| 2016/0118815 | A1 | * | 4/2016 | Kanou | G06F 1/1632 320/138 |
| 2016/0254664 | A1 | * | 9/2016 | Huang | H02J 7/0025 307/52 |
| 2016/0334943 | A1 | * | 11/2016 | Jeon | G06F 3/0482 |
| 2016/0352101 | A1 | * | 12/2016 | Koo | H02J 1/12 |
| 2018/0059750 | A1 | * | 3/2018 | Kaechi | G06F 1/26 |
| 2018/0145530 | A1 | * | 5/2018 | Lee | H02J 7/00047 |
| 2018/0175636 | A1 | | 6/2018 | Choi | |
| 2019/0086874 | A1 | * | 3/2019 | Kato | G04C 10/02 |
| 2019/0187766 | A1 | * | 6/2019 | Hirosawa | G06F 1/28 |
| 2019/0258832 | A1 | | 8/2019 | Jung et al. | |
| 2020/0144827 | A1 | | 5/2020 | Tian et al. | |
| 2020/0295585 | A1 | | 9/2020 | Ota et al. | |
| 2021/0351608 | A1 | * | 11/2021 | Cook | H02J 9/005 |
| 2022/0103006 | A1 | * | 3/2022 | Inai | H02J 9/06 |
| 2022/0103008 | A1 | * | 3/2022 | Torres Carino | H02J 7/0068 |

FOREIGN PATENT DOCUMENTS

| | | |
|---|---|---|
| JP | 2014-117083 A | 6/2014 |
| JP | 2018-32221 A | 3/2018 |
| JP | 2020-57885 A | 4/2020 |
| KR | 10-2005-0019544 A | 3/2005 |
| KR | 10-0528457 B1 | 1/2006 |
| KR | 10-2010-0092655 A | 8/2010 |
| KR | 10-2010-0131608 A | 12/2010 |
| KR | 10-2012-0014801 A | 2/2012 |
| KR | 10-2018-0058368 A | 6/2018 |
| KR | 10-2018-0069640 A | 6/2018 |
| KR | 10-2019-0100601 A | 8/2019 |

OTHER PUBLICATIONS

Written Opinion (PCT/ISA/237) issued Nov. 24, 2021 by the International Searching Authority in International Patent Application No. PCT/KR2021/010731.
Office Action issued on Jun. 3, 2024 by the Indian Patent Office in corresponding IN Patent Application No. 202317016861.
Communication issued Jan. 3, 2024 by the European Patent Office in European Patent Application No. 21872718.8.
Communication issued on Oct. 17, 2024 by the Korean Intellectual Property Office in Korean Patent Application No. 10-2020-0184382.
Communication issued Jun. 24, 2025 by the Korean Intellectual Property Office in Korean Patent Application No. 10-2020-0184382.
Communication issued on Dec. 3, 2025 by the European Patent Office in European Patent Application No. 21872718.8.

* cited by examiner

METHOD FOR CONTROLLING POWER SUPPLY AND ELECTRONIC DEVICE USING SAME

CROSS-REFERENCE TO RELATED APPLICATIONS

This application is by-pass continuation application of International Application No. PCT/KR2021/010731, filed on Aug. 12, 2021, which based on and claims priority to Korean Patent Application No. 10-2020-0125247, filed on Sep. 25, 2020, in the Korean Intellectual Property Office, and to Korean Patent Application No. 10-2020-0184382, filed on Dec. 28, 2020, in the Korean Intellectual Property Office the disclosures of which are incorporated by reference herein in their entireties.

BACKGROUND

1. Field

The disclosure relates to a method of controlling a supply of power and an electronic device using the same.

2. Description of Related Art

As technology has been developed, the use of electronic devices including batteries has been increased in the information technology (IT) industry and one or more other industrial fields such as vehicle, construction, or the like. Using an embedded battery, an electronic device may supply power to each internal component thereof. Although an electronic device includes a battery embedded therein, the electronic device may receive power supplied from the outside (e.g., an external battery, an external power adaptor). Using the power from the outside, the electronic device may supply power to each internal component and may also charge the embedded battery. Some electronic devices may have detachable batteries.

Some electronic devices require a dummy battery attached thereto to connect to an external power source, in order to use power in the state in which a battery is removed therefrom, which is a drawback.

In the case of an external power source, power that is capable of being supplied to an electronic device may be limited depending on the type of adaptor and thus, if an electronic device at least briefly uses a larger amount of power than the amount of power supplied by the external power source, the power of the electronic device may be turned off.

In the case where an electronic device is connected to an external power source, the power of the electronic device may need to be turned off in order to attach or detach an embedded battery.

A battery may be significantly affected by temperature. In the case that a battery is used at a low temperature, performance may deteriorate. In the case that a battery is used at a high temperature, the lifecycle of the battery may decrease and a risk of explosion may increase.

SUMMARY

According to an aspect of the disclosure, an electronic device includes: a first component included in the electronic device; a port configured to connect to an external power source; a battery; and a processor configured to: select an object to supply power to the first component included in the electronic device; and perform control so as to provide, using the selected object, power to the first component included in the electronic device.

The processor may be further configured to: determine whether the external power source is connected to the electronic device; and based on determining that the external power source is connected, add the external power source as an object to supply power to the first component included in the electronic device.

The processor may be further configured to: based on determining that the external power source is connected to the electronic device, identify a voltage of the external power source; and control, based on the identified voltage of the external power source, a performance of the first component.

The processor may be further configured to control the performance of the first component differently according to the voltage of the external power source.

The processor may be further configured to: based on determining that the external power source is connected to the electronic device, identify a voltage of the external power source; and based on the voltage of the external power source being lower than a predetermined voltage, perform control so as to supply power using the battery.

The processor may be further configured to, based on determining that the external power source is not connected to the electronic device, inactivate a related menu.

The object to supply power to the first component included in the electronic device may be selected by a user.

The object to supply power to the first component included in the electronic device may be selected using a quick panel.

The processor may be further configured to: determine whether the external power source is connected to the electronic device; based on determining that the external power source is connected to the electronic device, identify a voltage of the external power source; identify, based on the identified voltage of the external power source, a priority order of internal components of the electronic device; and control the internal components of the electronic device according to the identified priority order.

The processor may be further configured to control, based on the identified priority order, at least one of a clock of a central processing unit (CPU) of the processor, an audio volume, a brightness of a screen, a switching of a network, whether to operate an application, a sound effect, and a display scanning rate.

According to an aspect of the disclosure, a method of controlling supply of power by an electronic device, includes: selecting an object to supply power to a first component included in the electronic device; and supplying, using the selected object, power to the first component included in the electronic device.

The selecting the object to supply power to the first component included in the electronic device includes: determining whether an external power source is connected to the electronic device; and based on determining that the external power source is connected to the electronic device, adding the external power source as an object to supply power to the first component included in the electronic device.

The method may further include: based on determining that the external power source is connected to the electronic device, identifying a voltage of the external power source; and controlling, based on the identified voltage of the external power source, a performance of the first component.

The controlling the performance of the first component based on the identified voltage of the external power source may include controlling the performance of the first component differently according to the voltage of the external power source.

The method may further include: based on determining that the external power source is connected to the electronic device, identifying a voltage of the external power source, and based on the voltage of the external power source being lower than a predetermined voltage, supplying power by using a battery.

According to one or more embodiments of the disclosure, in the state in which a battery of an electronic device is removed from the electronic device, a user may use the electronic device by connecting to an external power source without using a dummy battery.

According to one or more embodiments of the disclosure, in the case that an external power source is connected, an electronic device may limit the performance of each internal component so as to control the amount of power used by the electronic device to be lower than the amount of power supplied by the external power source.

According to one or more embodiments of the disclosure, even when an electronic device is connected to an external power source and the power is turned on, a user is capable of attaching or detaching a battery.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
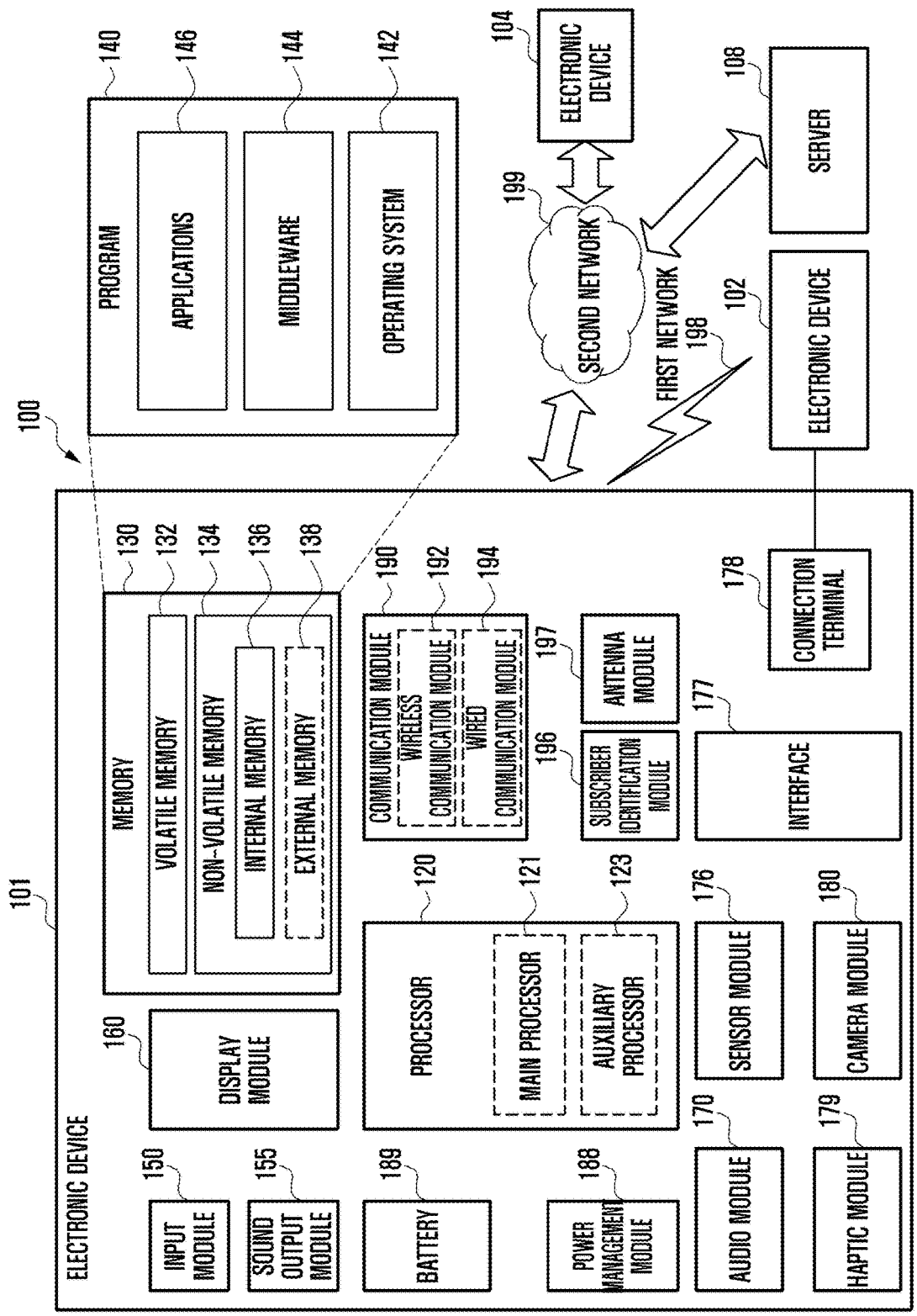
FIG. 1 is a block diagram of an electronic device in a network environment according to one or more embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
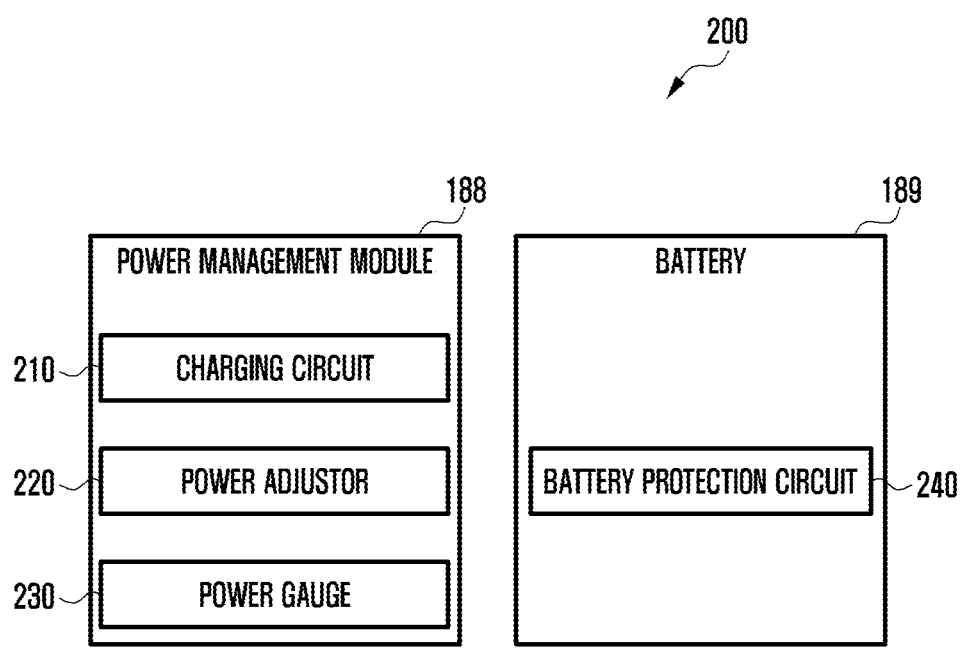
FIG. 2 is a block diagram illustrating a power management module and a battery according to one or more embodiments.

FIG. 2 is a block diagram 200 illustrating a power management module 188 and a battery 189 according to one or more embodiments.

Referring to FIG. 2, the power management module 188 may include a charging circuit 210, a power adjustor 220, or a power gauge 230. The charging circuit 210 may charge the battery 189 using power supplied from an external power source of the electronic device 101. According to an embodiment, the charging circuit 210 may select a charging scheme (e.g., a normal charging or a fast charging) based at least partially on the type of external power source (e.g., a power adapter, a USB, or a wireless charger), the magnitude of power providable from the external power source (e.g., approximately 20 W or more), or the attributes of the battery 189, and may charge the battery 189 using the selected charging scheme. The external power source may be connected to the electronic device 101 in a wired manner, for example, via the connection terminal 178, or may be connected in a wireless manner via the antenna module 197.

The power adjustor 220 may produce multiple pieces of power having different voltage levels or different current levels by adjusting the voltage level or current level of the power supplied from, for example, an external power source or the battery 189. The power adjustor 220 may adjust power of the external power source or the battery 189 to have a voltage level or current level appropriate for each of some component elements among the component elements included in the electronic device 101. According to an embodiment, the power adjustor 220 may be embodied in the form of a low drop out (LDO) regulator or a switching regulator. The power gauge 230 may measure usage state information of the battery 189 (e.g., the capacity of the battery 189, the number of times that the battery is charged/discharged, a voltage, or a temperature).

Using, for example, the charging circuit 210, the power adjustor 220, or the power gauge 230, the power management module 188 may determine charging state information (e.g., a life span, overvoltage, low-voltage, overcurrent, overcharge, overdischarge, overheating, short circuit, or swelling) related to charging of the battery 189 based at least partially on the measured usage state information. The power management module 188 may determine whether the battery 189 is normal or abnormal based at least partially on the determined charging state information. In the case that the state of the battery 189 is determined as being abnormal, the power management module 188 may adjust charging of the battery 189 (e.g., decrease a charging current or voltage, or stop charging). According to an embodiment, at least some of the functions of the power management module 188 may be performed by an external control device (e.g., the processor 120).

The battery 189, according to an embodiment, may include a battery protection circuit (protection circuit module (PCM)) 240. The battery protection circuit 240 may perform one or more functions among the one or more functions (e.g., a previous blocking function) for preventing damage or deterioration in performance of the battery 189. The battery protection circuit 240 may be additionally or alternatively configured as at least a part of a battery management system (BMS) that is capable of performing one or more functions including cell balancing, measuring the capacity of the battery, measuring the number of times that charging/discharging is performed, measuring a temperature, or measuring a voltage.

According to an embodiment, at least a part of the usage state information or the charging state information of the battery 189 may be measured using a corresponding sensor (e.g., a temperature sensor) among a sensor module 176, the power gauge 230, or the power management module 188. According to an embodiment, the corresponding sensor (e.g., a temperature sensor) in the sensor module 176 may be included as a part of the battery protection circuit 240, or may be prepared as a separate device and may be disposed near the battery 189.

Figure 3:
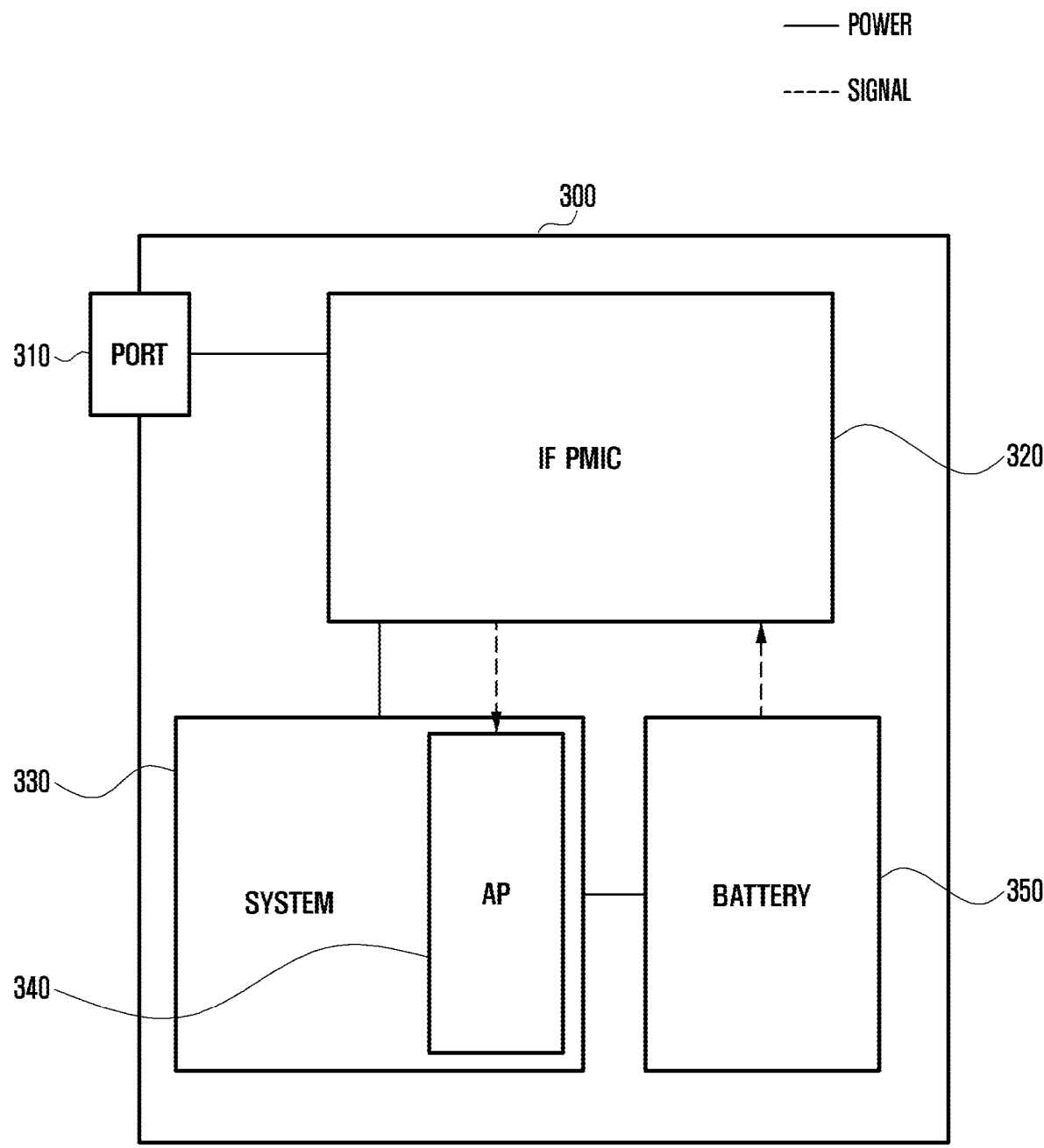
FIG. 3 is a diagram schematically illustrating an electronic device according to one or more embodiments.

FIG. 3 is a diagram schematically illustrating an electronic device according to one or more embodiments.

Specifically, FIG. 3 may briefly illustrate the components 300 needed for the electronic device of FIG. 1 and FIG. 2 in order to describe the disclosure, and may further include another component other than the illustrated components. Referring to FIG. 3, an electronic device (e.g., the electronic device 101 of FIG. 1) may include a port 310 (e.g., a connection terminal 178 of FIG. 1), an interface power management IC (IF PMIC) 320 (e.g., the power management module 188 of FIG. 1), a battery 350 (e.g., the battery 189 of FIG. 1), and a system 330 including an application processor (AP) 340. The system 330 of FIG. 3 may include a communication processor (CP) in addition to the AP 340, a display (e.g., the display module 160 of FIG. 1), an antenna (e.g., the antenna module 197 of FIG. 1), a communication module (e.g., the communication module 190 of FIG. 1), and the like, and a component that is an internal component of the electronic device 101 and receives power supplied may be included in the system 330. That is, in FIG. 3, any component that is an internal component of the electronic device 101 and receives power supplied may be referred to as the system 330.

According to one or more embodiments, the port 310 may be a connection terminal to which power may be supplied from the outside. For example, it may be a universal serial bus (USB) port or may be an adaptor port.

According to one or more embodiments, the IF PMIC 320 may receive power from an external power source (e.g., an external battery, an adaptor) connected via the port 310, and may supply the power to the system 330. Alternatively, the IF PMIC 320 may enable the battery 350 to supply power to the system 330.

According to one or more embodiments, the IF PMIC 320 may identify, based on sensing information, whether the battery 350 is attached. If the battery 350 is attached or detached, the IF PMIC 320 may produce an event (e.g., a direct power mode, u event (that occurs when a battery_present value is changed)), and may transmit the same to the AP 340. Alternatively/additionally, the IF PMIC 320 may store information related thereto in a predetermined variable (e.g., sysfs). The AP 340 may read the value of a predetermined variable when needed and may determine whether the battery 350 is detached.

According to one or more embodiments, in the state in which an external power source is connected and the battery 350 is attached, the IF PMIC 320 may transmit, to an application, information associated with whether the battery 350 is attached so that the performance of the electronic device 101 is not limited.

According to one or more embodiments, in the case that an external power source is connected to the port 310, the IF PMIC 320 may sense the voltage of the external power source, and may identify whether power is capable of being supplied to the system 330. For example, the IF PMIC 320 checks a VF terminal of the battery in the state in which the external power source is connected, and if the VF terminal is in an off state, the IF PMIC 320 may determine that the battery is not present. The IF PMIC 320 identifies an ADC value of the VF terminal, and if the identified ADC value falls within a predetermined range, the IF PMIC 320 may determine that the battery is a genuine battery. If the identified ADC value is beyond the predetermined range, the IF PMIC 320 may determine that the battery is a dummy battery. If the voltage of the sensed value of the external power source is lower than a predetermined voltage, the IF PMIC 320 may supply power to the system 330 using the battery 350. The voltage that is capable of supplying power to the system 330 may be determined in advance.

According to one or more embodiments, the AP 340 may identify the ADC value of the VF terminal and may identify whether the value falls within a predetermined range. Using the identified ADC value, the AP 340 may identify whether the connected battery 350 is a genuine battery or a dummy battery.

Figure 4:
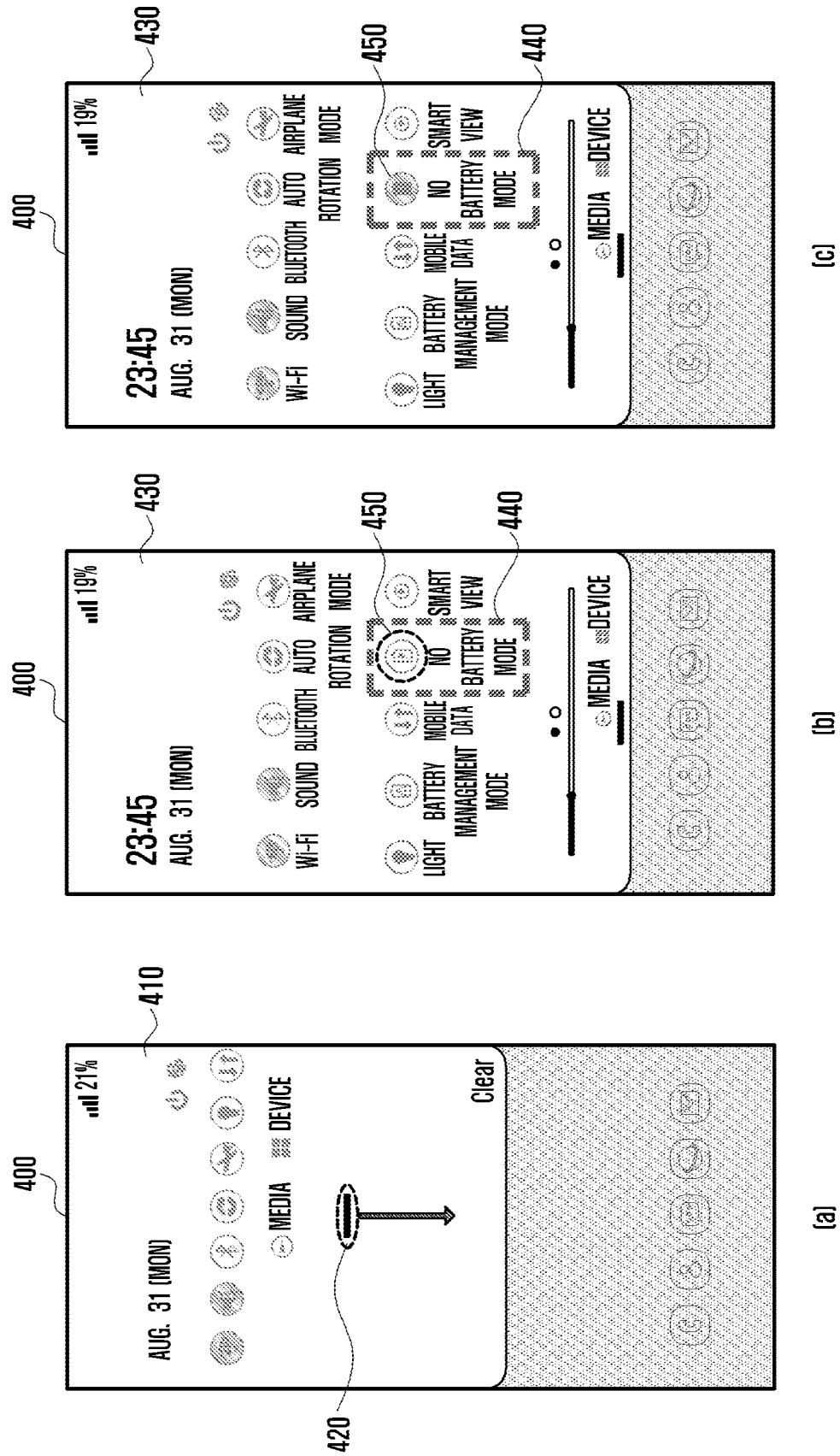
FIG. 4 is a diagram illustrating an example of a user interface that controls supplying of power according to one or more embodiments.

FIG. 4 is a diagram illustrating an example of a user interface that controls supply of power according to one or more embodiments.

According to one or more embodiments, an electronic device (e.g., the electronic device 101 of FIG. 1) may include at least one control menu (e.g., a tile) in a quick panel 410. A user may set a function using a control menu. When the number of control menus to be displayed in the quick panel 410 is increased, extension of the quick panel 410 may be supported. For example, in the case that a total of seven control menus are capable of being displayed in the quick panel 410 basically provided, the quick panel 410 may be extended in order to display ten control menus in the quick panel 410.

Hereinafter, a user gesture may be used via a user interface. The user gesture may be any one of, for example, a tap, a touch, a click, a double-tap, a press, a long-press, a drag, a pinch in, a pinch out, a rotate, a swipe, a flick, and a pan, or a combination thereof. In addition, one of a body or a movement of a body capable of being recognized by a camera and/or a sensor may be used as a user gesture, and a user gesture is not limited thereto.

According to one or more embodiments, the user may display the quick panel 410 on a display 400 (e.g., the display module 160 of FIG. 1) using a first gesture. A button 420 for extending the quick panel 410 may be included in the quick panel 410. For example, a user may extend the quick panel 410 using the button 420 as shown in FIG. 4A. FIG. 4B illustrates an example of an extended quick panel 430. Referring to FIG. 4B, multiple control menus may be displayed in the extended quick panel 430. A control menu 440 for controlling supply of power may be included in the extended quick panel 430. Although FIG. 4 illustrates that the control menu 440 for controlling supply of power is displayed in the extended quick panel 430, this is not limited thereto.

According to one or more embodiments, using a second gesture (e.g., a touch), a user may select or cancel an icon 450 of the control menu 440 that is capable of controlling supply of power. As illustrated in FIG. 4C, in the case that the icon 450 of the control menu 440 is selected, a mode based on a setting may be executed. For example, in the case that a no battery mode is selected via the control menu 440, the no battery mode may be turned on. The user may select the icon 450 of the control menu 440 again, so as to turn off the no battery mode. Although FIG. 4 provides a description by taking a no battery mode as a control menu, a battery presence mode may be used. As another example, an external power source connection mode may be turned on/off using the control menu 440. As another example, in the case that multiple modes are present, the modes may be sequentially changed (e.g., an embedded battery connection mode→an external battery connection mode→an external power source connection mode) using the control menu 440.

According to one or more embodiments, in the case that a no battery mode is turned on/off based on whether the icon 450 of the control menu 440 is selected, the electronic device 101 may store related information (e.g., the no batter mode is turned on) in a database. When needed, the electronic device 101 may read information stored in the database. Based on the read information, the electronic device 101 may select an object to supply power to each internal component.

Figure 5:
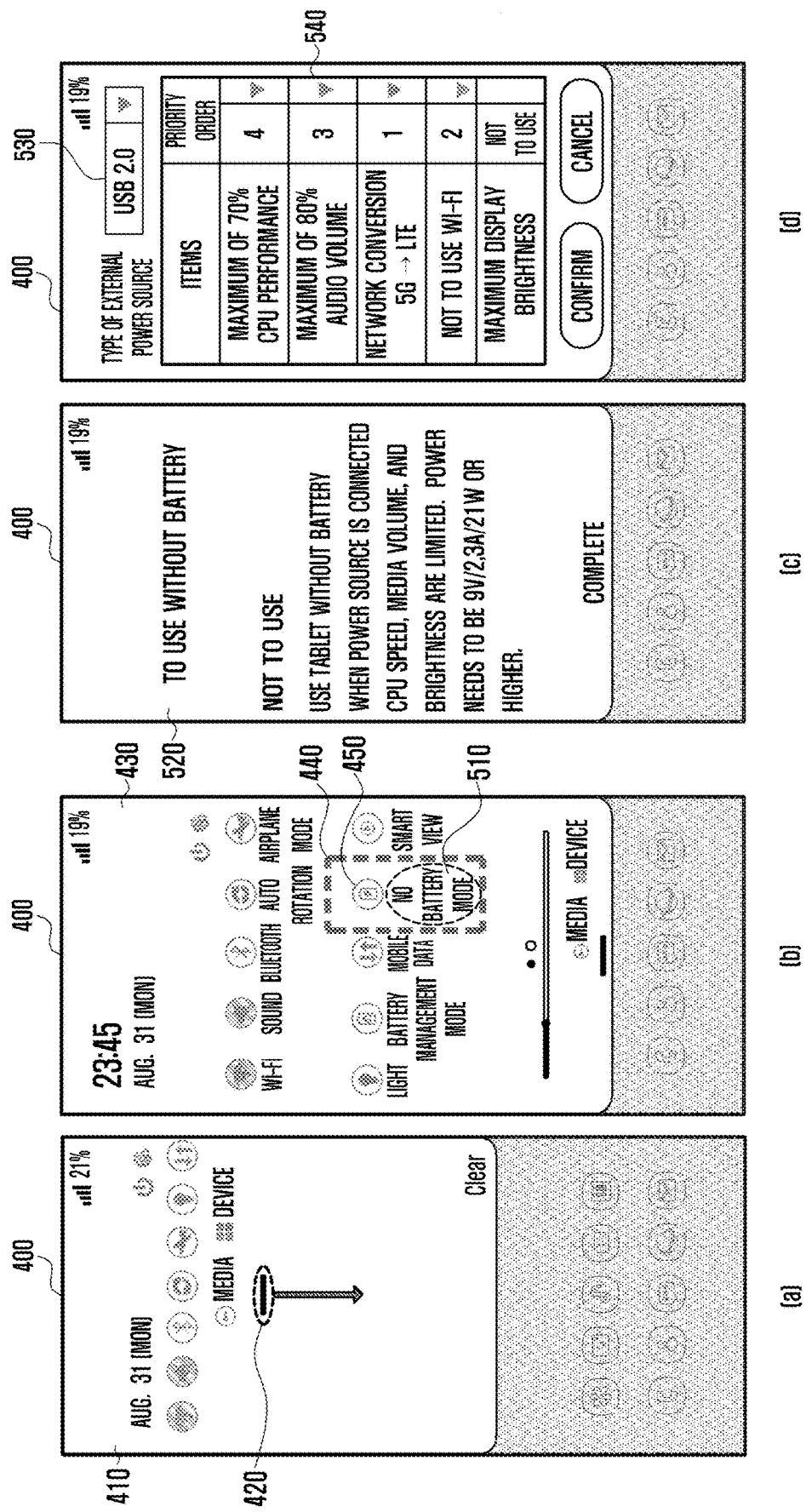
FIG. 5 is a diagram illustrating an example of a user interface that sets supplying of power according to one or more embodiments.

FIG. 5 is a diagram illustrating an example of a user interface that sets supplying of power according to one or more embodiments.

According to one or more embodiments, an electronic device (e.g., the electronic device 101 of FIG. 1) may include at least one control menu in the quick panel 410. A user may set a function using a control menu. When the number of control menus to be displayed in the quick panel 410 is increased, extension of the quick panel 410 may be supported. For example, in the case that a total of seven control menus are capable of being displayed in the quick panel 410 basically provided, the quick panel 410 may be extended in order to display ten control menus in the quick panel 410.

According to one or more embodiments, the user may display the quick panel 410 on a display 400 (e.g., the display module 160 of FIG. 1) using a first gesture. A button 420 for extending the quick panel 410 may be included in the quick panel 410. A user may extend the quick panel 410 using, for example, the button 420 as shown in FIG. 5A. FIG. 5B illustrates an example of an extended quick panel 430. Referring to FIG. 5B, multiple control menus may be displayed in the extended quick panel 430. A control menu 440 for controlling supply of power may be included in the extended quick panel 430. Although FIG. 5 illustrates that the control menu 440 capable of controlling supply of power is displayed in the extended quick panel 430, this is not limited thereto.

According to one or more embodiments, using a third gesture (e.g., a touch), a user may select text 510 of the control menu 440 that is capable of controlling supply of power. In the case that the text 510 is selected using the third gesture, a screen 520 including detailed information associated with a selected setting may be provided as shown in FIG. 5C. Referring to FIG. 5C, 'no battery mode' is associated with to use without a battery, and describes that a tablet is capable of being used without a battery when a power source is connected, and a CPU speed, a media volume, and a brightness may be limited. In addition, in order to use without a battery, it is described, to the user, that the specifications of an external power source need to be 9V/2.32A/21 W or higher. The description may be helpful when the user selects an external power source to provide power to the electronic device.

According to one or more embodiments, a menu for controlling supply of power may be further included in the screen 520 that provides detailed information. Alternatively/additionally, a menu for controlling supply of power may be provided as a separate widget.

Referring to FIG. 5D, when an external power source is connected, for example through the specification 530, a menu 540 for setting an item of which the performance is to be limited may be further included in the screen 520 that provides detailed information. For example, in the case that a list capable of being set as performance limit items is displayed, the user may select a priority order of the performance limit items displayed in the list. The set priority order may be set differently according to the specification of an external power source. The performance limit items capable of being set may include at least one of a CPU performance, audio volume adjustment, a screen brightness, switching of a network, whether to operate an application, sound effect (e.g., sound boosting), and a display scanning rate. For example, in the case that the specification of an external power source is low, the priority of the switching of a network that consumes the largest amount of power may be set to be higher than the priorities of the other items. The performance limit items capable of being set may be differently provided depending on the specification of the electronic device. For example, depending on whether an application installed in an electronic device is present and whether an electronic device supports a predetermined function, performance limit items of which the priorities to be set may be changed.

Figure 6:
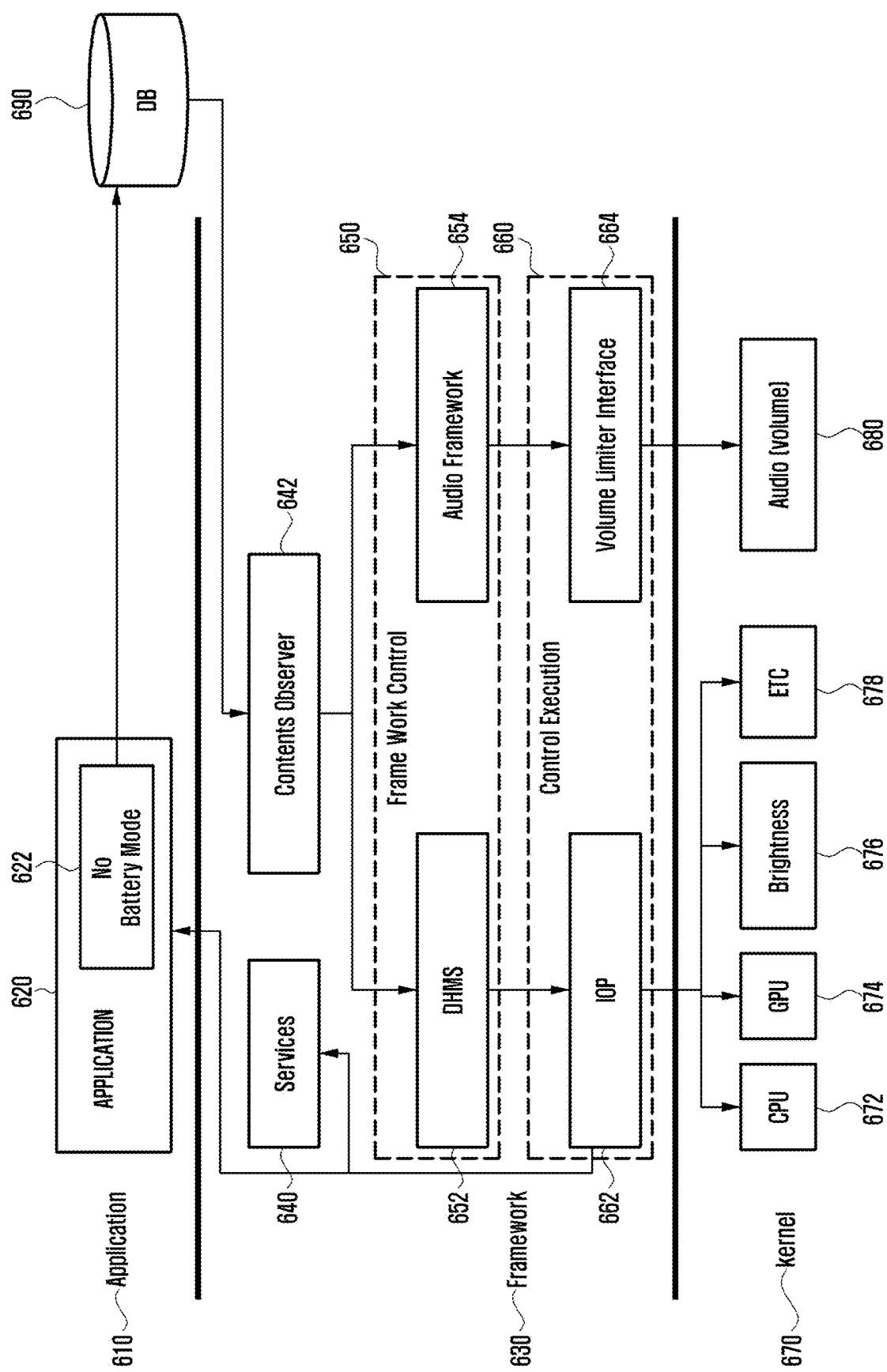
FIG. 6 is a diagram illustrating an example of the configuration of an electronic device according to one or more embodiments.

FIG. 6 is a diagram illustrating an example of the configuration of an electronic device according to one or more embodiments.

According to one or more embodiments, an electronic device (e.g., the electronic device 101 of FIG. 1) may include an application unit 610, a framework unit 630, and a kernel unit 670. The electronic device may further include a database (DB) 690 therein.

According to one or more embodiments, an object to supply power to an internal component of the electronic device may be set and/or selected by an application 620. The application 620 may store, in the database 690, the set and/or selected object to supply power to an internal component of the electronic device. The application 620 may store, in the form of a mode in the database 690, the set and/or selected object to supply power to an internal component of the electronic device. A user may change a setting using a control menu (e.g., a control menu 440 of FIG. 4) included in a quick panel (e.g., the quick panel 410 of FIG. 4) without executing the application 620. Information (e.g., no battery mode) associated with the setting changed via the quick panel 410 may also be stored in the database 690.

According to one or more embodiments, a mode capable of being set or selected by the application 620 may be one of a no battery mode 622 or a battery use mode. The no battery mode 622 or the battery use mode may be provided in the form of a toggle button. Alternatively, the no battery mode 622 or the battery use mode may be provided in the form in which the name of a button is changed. The no battery mode 622 may be selected, for example, when a battery is not attached to the electronic device or when an external power source is desired to be used in the state in which the external power source is connected. The battery use mode may be selected, for example, when a battery is attached to the electronic device. According to one or more embodiments, even though the battery is attached to the electronic device 101, a user may select the no battery mode 622 so as to detach a battery and to use an external power source.

According to one or more embodiments, the framework unit 630 may operate services 640 and register a contents observer 642 with the database 690. When information stored in the database 690 is changed, the contents observer 642 may call a related service of a framework control 650 using a function (e.g., callback). For example, a device health manager service (DHMS) 652 and the audio framework 654 of a framework control execution 660 may execute the contents observer 642, and the contents observer 642 may call the device health manage service 652 and the audio framework 654 when information stored in the database 690 is changed.

According to one or more embodiments, if it is identified that an external power source is connected, the device health manager service 652 and the audio framework 654 may identify the specifications of the connected external power source and may further identify whether a battery is attached. For example, whether the battery is attached may be identified based on PowerManagerService. When an external power source is connected, a battery manager may produce intent.action_battery_changed, and information associated with the specifications of the connected external power source may be included in an intent. Table 1 provided below lists examples of the value of extra according to the specifications of an external power source.

TABLE 1

| TA type | Definition of value of extra |
|---|---|
| USB 2.0 TA | public static final int<br>BATTERY_CHARGER_TYPE_NORMAL = 0; |
| 10 W TA | public static final int<br>BATTERY_CHARGER_TYPE_FAST = 1; |
| 18 W TA | public static final int<br>BATTERY_CHARGER_TYPE_FAST_12 V = 2; |
| 25 W TA | public static final int<br>BATTERY_CHARGER_TYPE_FAST_25 W = 3; |
| 45 W TA | public static final int<br>BATTERY_CHARGER_TYPE_FAST_45 W = 4; |

According to one or more embodiments, a level of limiting a performance is differently set according to the specifications of an external power source and thus a phenomenon in which power is turned off may not occur. Table 2, provided below, may be an example of performance limitation according to a performance limit priority order set by an application, and the specifications of an external power source to be connected. The performance limitation of an internal component of an electronic device may be changed based on an internal component included in the electronic device. For example, the size of a display included in an electronic device may be different for each electronic device, and the specifications of an AP may also be different. In addition, an application installed in the electronic device may also be different for each electronic device, and power consumed by each application may also be different from each other. For example, an application such as Pay, Multi-window, Power sharing, and the like may instantaneously use significantly high power and thus control may be performed so that power consumed by the application is reduced.

TABLE 2

| TA type | performance limitation |
|---|---|
| 5 V TA | CPU performance limitation to 70%, LCD MAX brightness limitation, MAX volume limitation to 70%, forced conversion of network to LTE, limitation of use of app that consumes large amount of power such as camera or the like |
| 12 V TA | CPU performance limitation to 70%, LCD MAX brightness limitation, MAX volume limitation to 80% |
| 25 W TA | CPU performance limitation to 70% |
| 45 W TA | No performance limitation |

According to various embodiments, the performance of the same components may be differently set according to the specifications of an external power source as shown in Table 2.

According to one or more embodiments, when the device health manager service 652 is called by a function of the contents observer 642, the device health manager service 652 may perform an intelligent overheat protector (IOP) 662 that controls a kernel unit 670. Based on the information stored in the database 690, the intelligent overheat protector 662 may control a CPU 672, a GPU 674, a brightness 676, and others (e.g., ETC 678) of the kernel unit 670. Based on information transferred by the function of the contents observer 642, the intelligent overheat protector 662 may control the CPU 672, the GPU 674, the brightness 676, and others (e.g., ETC 678) of the kernel unit 670. For example, the intelligent overheat protector 662 may control a clock of the CPU 672 to run fast or slowly. As another example, the intelligent overheat protector 662 may control the display to be dark or bright by adjusting the brightness 676.

According to one or more embodiments, when the audio framework 654 is called by a function of the contents observer 642, the audio framework 654 may perform a volume limiter interface 664 that controls the kernel unit 670. Based on the information stored in the database 690, the volume limiter interface 664 may control the audio volume 680 of the kernel unit 670. The volume limiter interface 664 may control the audio volume 680 of the kernel unit 670 based information transferred by the function of the contents observer 642. For example, the volume limiter interface 664 may increase or decrease the audio volume 680.

Figure 7:
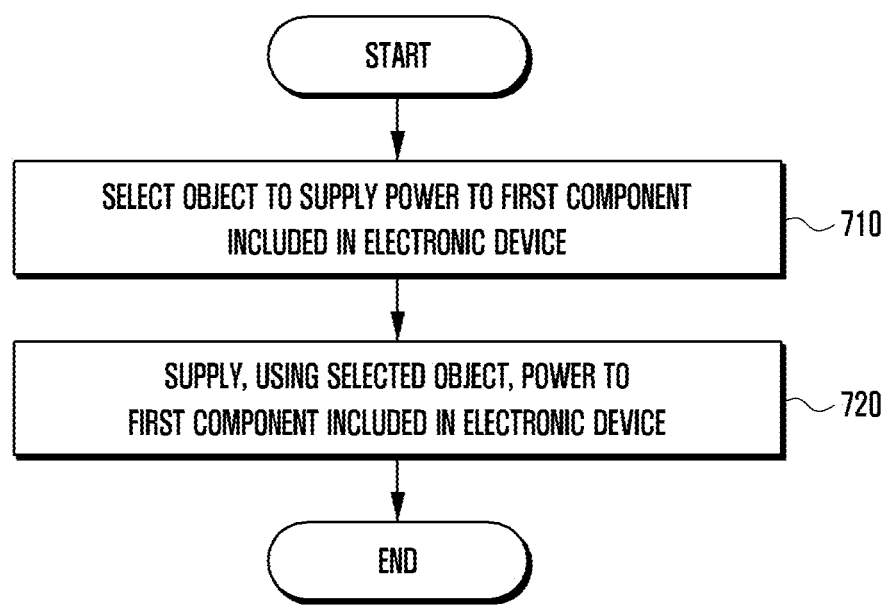
FIG. 7 is a flowchart of an electronic device according to one or more embodiments.

FIG. 7 is a flowchart illustrating an electronic device according to one or more embodiments.

According to one or more embodiments, an electronic device (e.g., the electronic device 101 of FIG. 1) may select an object to supply power to a first component (e.g., the processor 120 of FIG. 1) included in the electronic device 101 in operation 710.

According to one or more embodiments, the electronic device 101 may determine whether an external power source (e.g., an external battery, an adaptor) is connected. In the case that the external power source is determined as being connected, the electronic device 101 may add the external power source as an object to supply power to the first component included in the electronic device. The added external power source may be provided to a user interface and may be selected by a user.

According to one or more embodiments, in the case that the external power source is determined as being connected, the electronic device 101 may identify power of the external power source. The electronic device 101 may control performance of the first component based on the power of the external power source.

According to one or more embodiments, using the selected object, the electronic device 101 may supply power to the first component 120 included in the electronic device 101 in operation 720. Using the selected object, the electronic device 101 may supply power to a component other than the first component 120.

According to one or more embodiments, the object to supply power to the first component 120 included in the electronic device 101 may be an external power source or a battery. When changing an object to supply power to the first component 120, the electronic device 101 may not turn off power. For example, the electronic device 101 may attach or detach a battery while receiving power from the external power source and supplying the power to the first component 120.

An electronic device according to one or more embodiments of the disclosure may include a first component included in the electronic device, a port configured to connect an external power source, a battery, and a processor, and the processor may be configured to select an object to supply power to the first component included in the electronic device, and to perform control so as to provide, using the selected object, power to the first component included in the electronic device.

The processor of the electronic device according to one or more embodiments of the disclosure may be configured to determine whether an external power source is connected using the port, and to add the external power source as an object to supply power to the first component included in the electronic device in the case that the external power source is determined as being connected.

The processor of the electronic device according to one or more embodiments of the disclosure may be configured to identify a voltage of the external power source in the case that the external power source is determined as being connected, and to control, based on the identified voltage of the external power source, performance of the first component.

The processor of the electronic device according to one or more embodiments of the disclosure may be configured to control the performance of the first component differently according to the voltage of the external power source.

The processor of the electronic device according to one or more embodiments of the disclosure may be configured to identify a voltage of the external power source in the case that the external power source is determined as being connected, and to perform control so as to supply power using a battery in the case that the voltage of the external power source is lower than a predetermined voltage.

In the case that the external power source is determined as not being connected, the processor of the electronic device according to one or more embodiments of the disclosure may be configured to inactivate a related menu.

In the electronic device according to one or more embodiments of the disclosure, the object to supply power to the first component included in the electronic device is selected by a user.

In the electronic device according to one or more embodiments of the disclosure, the object to supply power to the first component included in the electronic device is selected using a quick panel.

The processor of the electronic device according to one or more embodiments of the disclosure may be configured to determine whether an external power source is connected, to identify a voltage of the external power source in the case that the external power source is determined as being connected, to identify, based on the identified voltage of the external power source, a priority order of internal components of the electronic device, and to control the internal components of the electronic device according to the identified priority order.

The processor of the electronic device according to one or more embodiments of the disclosure may be configured to control, based on the identified priority order, at least one of a clock of a central processing unit (CPU), an audio volume, brightness of a screen, switching of a network, whether to operate an application, sound effect, and a display scanning rate.

A method of controlling supply of power by an electronic device according to one or more embodiments may include an operation of selecting an object to supply power to a first component included in the electronic device, and an operation of supplying, using the selected object, power to the first component included in the electronic device.

In the method of controlling supply of power by an electronic device according to one or more embodiments, the operation of selecting the object to supply power to the first component included in the electronic device may include an operation of determining whether an external power source is connected, and an operation of adding the external power source as an object to supply power to the first component included in the electronic device in the case that the external power source is determined as being connected.

The method of controlling supply of power by an electronic device according to one or more embodiments may further include an operation of identifying a voltage of the external power source in the case that the external power source is determined as being connected, and an operation of controlling, based on the identified voltage of the external power source, performance of the first component.

In the method of controlling supply of power by an electronic device according to one or more embodiments, the operation of controlling the performance of the first component based on the identified voltage of the external power source may include an operation of controlling the performance of the first component differently according to the voltage of the external power source.

The method of controlling supply of power by an electronic device according to one or more embodiments may further include an operation of identifying a voltage of the external power source in the case that the external power source is determined as being connected, and an operation of supplying power using a battery in the case that the voltage of the external power source is lower than a predetermined voltage.

In the method of controlling supply of power by an electronic device according to one or more embodiments, the operation of selecting the object to supply power to the first component included in the electronic device may include an operation of deactivating a related menu in the case that the external power source is determined as not being connected.

In the method of controlling supply of power by an electronic device according to one or more embodiments, the operation of selecting the object to supply power to the first component included in the electronic device may be an operation performed by a user.

In the method of controlling supply of power by an electronic device according to one or more embodiments, the operation of selecting the object to supply power to the first component included in the electronic device may be an operation performed using a quick panel.

The method of controlling supply of power by an electronic device according to one or more embodiments may further include an operation of determining whether an external power source is connected, an operation of identifying a voltage of the external power source in the case that the external power source is determined as being connected, an operation of identifying, based on the identified voltage of the external power source, a priority order of internal components of the electronic device, and an operation of controlling the internal components of the electronic device according to the identified priority order.

In the method of controlling supply of power by an electronic device according to one or more embodiments, the operation of controlling the internal components of the electronic device may be an operation of controlling at least one of a clock of a central processing unit (CPU), an audio volume, brightness of a screen, switching of a network, whether to operate an application, sound effect, and a display scanning rate.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
    a plurality of components;
    a port configured to connect to an external power source;
    a battery; and
    a processor configured to:
        determine whether the external power source is connected to the electronic device and whether the electronic device is set to a no battery mode, in which the plurality of components are to be supplied electricity regardless of whether the battery of the electronic device is detached from the electronic device, wherein determining whether the electronic device is set to the no battery mode comprises determining whether a selection of the no battery mode is set through a control menu included in a quick panel which the processor of the electronic device is configured to display on a display;
        based on determining that the external power source is connected to the electronic device and the electronic device is set to the no battery mode, identify whether the external power source is a first power adapter outputting a first voltage or a second power adapter outputting a second voltage different from the first voltage;
        when the external power source is identified as the first power adapter, set a performance of at least one of the plurality of components to a first value and provide power, using the external power source, to the at least one of the plurality of components, and
        when the external power source is identified as the second power adapter, set the performance of the at least one of the plurality of components to a second value different from the first value and provide power, using the external power source, to the at least one of the plurality of components.

2. The electronic device of claim 1, wherein the processor is further configured to:
    based on a voltage of the external power source being lower than a predetermined voltage, provide, using the battery, power to the at least one of the plurality of components.

3. The electronic device of claim 1, wherein the processor is further configured to, based on determining that the external power source is not connected to the electronic device, inactivate a related menu for setting how to supply power to the at least one of the plurality of components.

4. The electronic device of claim 1, wherein the processor is further configured to:
    in response to a user input, select an object from among the external power source or the battery as a power source, provide, using the selected object, power to the at least one of the plurality of components.

5. The electronic device of claim 4, wherein the electronic device comprises the display, and
    wherein the user input is received through the quick panel displayed by the display, and the object to supply power to the at least one of the plurality of components selected using the quick panel.

6. The electronic device of claim 1, wherein the processor is further configured to:
    based on determining that the external power source is connected to the electronic device, identify a voltage of the external power source;
    identify, based on the identified voltage of the external power source, a priority order of the plurality of components; and
    control a performance of each of the plurality of components according to the identified priority order.

7. The electronic device of claim 6, wherein the processor is further configured to control, based on the identified priority order, at least one of a clock of a central processing unit (CPU) of the processor, an audio volume, a brightness of a screen, a switching of a network, whether to operate an application, a sound effect, and a display scanning rate.

8. The electronic device according to claim 1, wherein the processor of the electronic device is further configured to control the display to display at least one of:
    instructions for using the electronic device while the battery is detached from the electronic device, and
    settings of the electronic device changed by at least whether the electronic device is set to the no battery mode.

9. The electronic device according to claim 8, wherein the processor is further configured to:
    determine an electrical characteristic of the external power source, the electrical characteristic being any of a voltage and a wattage of the external power source across the port; and
    based on determining that the electronic device is set to the no battery mode, control the display to display the settings differently depending on a result of determining the electrical characteristic of the external power source.

10. The electronic device according to claim 1, wherein the processor of the electronic device is further configured to select, based on whether the electronic device is set to the no battery mode, an object to supply power to the at least one of the plurality of components.

11. The electronic device according to claim 1, wherein the processor of the electronic device is further configured to control the display to display:
    instructions for using the electronic device while the battery is detached from the electronic device, and
    settings of the electronic device changed by at least whether the electronic device is set to the no battery mode.

12. A method of controlling supply of power by an electronic device, the method comprising:
    determining whether an external power source is connected to the electronic device and whether the electronic device is set to a no battery mode, in which a plurality of components of the electronic device are to be supplied electricity regardless of whether a battery of the electronic device is detached from the electronic device, wherein determining whether the electronic device is set to the no battery mode comprises determining whether a selection of the no battery mode is set through a control menu included in a quick panel which is displayed on a display of the electronic device;
    based on determining that the external power source is connected to the electronic device and the electronic device is set to the no battery mode, identifying whether the external power source is a first power adapter outputting a first voltage or a second power adapter outputting a second voltage different from the first voltage;
    when the external power source is identified as the first power adapter, setting a performance of at least one of the plurality of components of the electronic device to a first value and providing power, using the external power source, to the at least one of the plurality of components, and when the external power source is identified as the second power adapter, setting the performance of the at least one of the plurality of components to a second value different from the first value and providing power, using the external power source, to the at least one of the plurality of components.

13. The method of claim 12, further comprising:
based on a voltage of the external power source being lower than a predetermined voltage, provide, using a battery of the electronic device, power to the at least one of the plurality of components.

\* \* \* \* \*